US007917156B2

(12) United States Patent
Sheynblat

(10) Patent No.: US 7,917,156 B2
(45) Date of Patent: Mar. 29, 2011

(54) POSITION DETERMINATION FOR A WIRELESS TERMINAL IN A HYBRID POSITION DETERMINATION SYSTEM

(75) Inventor: Leonid Sheynblat, Hillsborough, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/625,241

(22) Filed: Nov. 24, 2009

(65) Prior Publication Data

US 2010/0173647 A1 Jul. 8, 2010

Related U.S. Application Data

(63) Continuation of application No. 10/132,501, filed on Apr. 24, 2002, now Pat. No. 7,623,871.

(51) Int. Cl.
*H04W 24/00* (2009.01)

(52) U.S. Cl. ................... 455/456.1; 455/456.6

(58) Field of Classification Search ............... 455/456.1, 455/456.6, 456.2, 456.5, 12.1, 13.2, 67.11, 455/456.3; 342/358, 357.03, 351, 357.01, 342/357.07, 357.08, 357.09, 356, 357.2, 342/357.39, 118

See application file for complete search history.

(56) References Cited

U.S. PATENT DOCUMENTS

| | | | |
|---|---|---|---|
| 5,526,357 A | | 6/1996 | Jandrell |
| 5,563,607 A | | 10/1996 | Loomis et al. |
| 5,717,406 A | | 2/1998 | Sanderford et al. |
| 5,774,829 A | * | 6/1998 | Cisneros et al. ............. 701/213 |
| 5,786,773 A | | 7/1998 | Murphy |
| 5,899,957 A | | 5/1999 | Loomis |
| 5,913,170 A | * | 6/1999 | Wortham ...................... 455/457 |
| 5,923,286 A | * | 7/1999 | Divakaruni ............. 342/357.06 |
| 5,995,043 A | * | 11/1999 | Murphy .................... 342/357.03 |
| 5,999,124 A | * | 12/1999 | Sheynblat ............... 342/357.09 |
| 6,075,987 A | * | 6/2000 | Camp et al. .................. 455/427 |
| 6,166,685 A | | 12/2000 | Soliman |

(Continued)

FOREIGN PATENT DOCUMENTS

EP 1102398 A2 * 5/2001

(Continued)

OTHER PUBLICATIONS

International Search Report - PCT/US03/012195, International Search Authority, European Patent Office, Sep. 4, 2003.

(Continued)

*Primary Examiner* — George Eng
*Assistant Examiner* — Brandon J Miller
(74) *Attorney, Agent, or Firm* — Linda G. Gunderson

(57) ABSTRACT

Techniques to determine a position estimate for a wireless terminal. An accurate position estimate for the terminal is initially obtained (e.g., based on a first (accurate) position determination sub-system). For each of one or more transmitters (e.g., base stations) in a second (less accurate) position determination sub-system, an "expected" pseudo-range is computed based on the accurate position estimate for the terminal and the base station location, a "measured" pseudo-range is also obtained, and a pseudo-range residual is then determined based on the expected pseudo-range and the measured pseudo-range. Thereafter, to determine an updated position estimate for the terminal, measured pseudo-ranges are obtained for a sufficient number of transmitters. The measured pseudo-range for each base station may be corrected based on the associated residual. The updated position estimate is then determined based on the corrected pseudo-ranges for these transmitters.

16 Claims, 5 Drawing Sheets

U.S. PATENT DOCUMENTS

| | | | |
|---|---|---|---|
| 6,195,046 B1 * | 2/2001 | Gilhousen | 342/457 |
| 6,212,391 B1 * | 4/2001 | Saleh et al. | 455/456.4 |
| 6,285,316 B1 * | 9/2001 | Nir et al. | 342/357.09 |
| 6,298,229 B1 * | 10/2001 | Tomlinson et al. | 455/404.2 |
| 6,393,291 B1 * | 5/2002 | Hwang | 455/456.1 |
| 6,408,178 B1 * | 6/2002 | Wickstrom et al. | 455/427 |
| 6,411,811 B2 | 6/2002 | Kingdon et al. | |
| 6,420,999 B1 * | 7/2002 | Vayanos | 342/357.03 |
| 6,430,416 B1 * | 8/2002 | Loomis | 455/456.1 |
| 6,433,734 B1 * | 8/2002 | Krasner | 342/357.09 |
| 6,445,927 B1 * | 9/2002 | King et al. | 455/456.6 |
| 6,449,485 B1 | 9/2002 | Anzil | |
| 6,538,601 B2 * | 3/2003 | Bruno et al. | 342/357.1 |
| 6,618,671 B2 * | 9/2003 | Dooley et al. | 701/213 |
| 6,636,744 B1 | 10/2003 | Da | |
| 6,671,620 B1 * | 12/2003 | Garin et al. | 701/213 |
| 6,853,916 B2 * | 2/2005 | Fuchs et al. | 701/213 |
| 7,623,871 B2 * | 11/2009 | Sheynblat | 455/456.1 |
| 2002/0067712 A1 * | 6/2002 | Bergkvist | 370/347 |
| 2002/0135510 A1 | 9/2002 | Bruno et al. | |
| 2003/0119496 A1 * | 6/2003 | Gaal et al. | 455/424 |

FOREIGN PATENT DOCUMENTS

| | | |
|---|---|---|
| EP | 1102399 A2 * | 5/2001 |
| EP | 1148344 A1 | 10/2001 |
| JP | 455784 | 2/1992 |
| JP | 2000244957 A | 9/2000 |
| JP | 2000244967 | 9/2000 |
| JP | 2001356162 | 12/2001 |
| WO | WO0029868 | 5/2000 |

OTHER PUBLICATIONS

Yamamoto et al., "Position Location Technologies Using Signal Strength in Cellular Systems," May 2001, IEEE Vehicular Technology Conference, pp. 2570-2574.

* cited by examiner

POSITION DETERMINATION FOR A WIRELESS TERMINAL IN A HYBRID POSITION DETERMINATION SYSTEM

CLAIM OF PRIORITY UNDER 35 U.S.C. §120

The present application for patent is a Continuation and claims priority to patent application Ser. No. 10/132,501 entitled "POSITION DETERMINATION FOR A WIRELESS TERMINAL IN A HYBRID POSITION DETERMINATION SYSTEM" filed Apr. 24, 2002, and assigned to the assignee hereof and hereby expressly incorporated by reference herein.

BACKGROUND

1. Field

The present invention relates generally to position determination. More specifically, the present invention relates to techniques for improving the accuracy and service availability in determining the position of a wireless terminal.

2. Background

It is often desirable, and sometimes necessary, to know the position of a wireless user. For example, the Federal Communications Commission (FCC) has adopted a report and order for enhanced 911 (E-911) wireless service that requires the location of a wireless terminal (e.g., a cellular phone) to be provided to a Public Safety Answering Point (PSAP) each time a 911 call is made from the terminal. The FCC mandate requires the location of the terminal to be accurate to certain specifications, which is within 50 meters for 67% of calls and within 150 meters for 95% of calls.

In addition to the FCC mandate, service providers have begun to recognize that location services (i.e., services that identify the position of a wireless terminal) may be used in various applications to provide value-added features that may generate additional revenue for the service providers. For example, a service provider may use location services to implement location-sensitive billing whereby different rates may be charged for calls originating from different zones. A service provider may also use location services to provide location-sensitive information such as driving directions, local information on traffic, gas stations, restaurants, hotels, and so on. Other applications that may be provided using location services include asset tracking services, asset monitoring and recovery services, fleet and resource management, personal-location services, and so on. These various applications typically require the location of each affected terminal be monitored by the system or that the terminal be able to continually update its position.

Various systems may be used to determine the position of a wireless terminal. One such system is the well-known Global Positioning System (GPS), which is a "constellation" of 24 well-spaced satellites that orbit the earth. Each GPS satellite transmits signals encoded with information that allows receivers on earth to measure the time of arrival of the received signals relative to an arbitrary point in time. This relative time-of-arrival measurement may then be converted to a "pseudo-range". The position of a GPS receiver may be accurately estimated (to within 10 to 100 meters for most GPS receivers) based on a sufficient number of pseudo-range measurements (typically four). However, GPS signals are received at very low power levels due to the relatively large distances between the satellites and the receivers, and most GPS receivers have great difficulty receiving GPS signals inside a building, under dense foliage, in urban settings in which tall buildings block much of the sky, and so on.

In a hybrid position determination system, signals from terrestrial or earth-bound base stations in a wireless communication system may also be used in place of, or to supplement, the signals from GPS satellites to determine the position of a wireless terminal. The wireless communication system may be a cellular communication system or some other system. A "hybrid" terminal would then include a GPS receiver for receiving GPS signals from the satellites and a "terrestrial" receiver for receiving "terrestrial" signals from earth-bound base stations. Similar to the GPS signals, the time of arrival of a received terrestrial signal may be measured relative to an arbitrary point in time and converted to a pseudo-range. Pseudo-range measurements to a sufficient number of base stations (e.g., three or more) may then be used to estimate the position of the terminal. It is well known that the terrestrial pseudo-ranges based on terrestrial signals are prone to exhibit relatively large errors due to timing and hardware errors in the base stations, timing and hardware errors in the receiver, and errors due to the propagation path. Consequently, the accuracy of a position estimate derived from terrestrial pseudo-range measurements is typically worse than that derived from GPS pseudo-range measurements.

A mobile terminal may move in and out of the coverage areas of the GPS and wireless communication system. To achieve high accuracy, it is desirable to use the GPS signals as often and to the extent possible to determine a position estimate for the terminal. Moreover, to achieve higher availability and greater coverage, it is desirable to use the terrestrial signals when and to the extent needed to determine the terminal position estimate.

There is therefore a need in the art for techniques to effectively use the GPS and terrestrial signals in a manner which provides high accuracy and high availability in determining a position estimate for a wireless terminal.

SUMMARY

Techniques are provided herein to provide improved accuracy and service availability in determining a position estimate for a wireless terminal. In an aspect, the terminal's position is first accurately determined based on an accurate position determination sub-system (which may be GPS). This accurate position estimate is then used to determine "residuals", which are corrections to be used for "actual" measurements obtained for a less accurate position determination sub-system (which may be a cellular communication system). Thereafter, the terminal's position may be determined based on the best set of measurements then available for the terminal. For example, a "GPS-based" solution may be computed if measurements for a sufficient number of satellites are available, a "hybrid" solution may be computed if measurement for at least one GPS satellite is available, and a "terrestrial-based" solution may be computed if measurements for only base stations are available.

For the hybrid and terrestrial-based solutions, the actual measurement for each base station (which may be a "measured" pseudo-range obtained based on a signal received from the base station) may be corrected using the residual determined for that base station. The residuals may be used to mitigate errors that are introduced by various components of the wireless network and the propagation medium. In this way, the highest possible accuracy may be achieved for the terminal position estimate based on the available position determination sub-system(s). Moreover, high availability is provided for the position determination because of the ability to supplement the more accurate (GPS) measurements with the less accurate (terrestrial) measurements when and to the extent necessary.

In a specific embodiment, a method is provided for determining a position estimate for a wireless terminal. In accordance with the method, an accurate position estimate for the terminal is initially determined based on a first (accurate) position determination sub-system (e.g., based on measured pseudo-ranges to a sufficient number of GPS satellites). An "expected" pseudo-range to each of one or more transmitters in a second (less accurate) position determination sub-system (e.g., one or more base stations in a cellular communication system) is then computed based on the accurate position estimate for the terminal and the known location for the transmitter. The expected pseudo-range is indicative of the line-of-sight distance between the terminal and the transmitter and may be considered as the "true" range. A measured pseudo-range for each base station is also obtained (e.g., based on pilot phase measurement for a forward link signal received from the base station in case of a CDMA-based wireless network). A pseudo-range residual is then determined for each base station based on the expected pseudo-range and the measured pseudo-range for the base station. The pseudo-range residual is assumed to be due to errors in the measurement made by the less accurate second sub-system.

Thereafter, to determine an updated position estimate for the terminal, measured pseudo-ranges are obtained for a sufficient number of transmitters, each of which may be a GPS satellite or a base station. The measured pseudo-range for each base station is then corrected based on the pseudo-range residual determined for that base station. The updated position estimate for the terminal is then determined based on (1) the measured pseudo-ranges (if any) for the GPS satellites, and (2) the corrected pseudo-ranges for the base stations.

In an embodiment, the updated position estimate for the terminal is determined based on (1) the first sub-system, if it is available, (2) the first and second sub-systems, if the first sub-system is partially available, or (3) the second sub-system only, if the first sub-system is unavailable.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
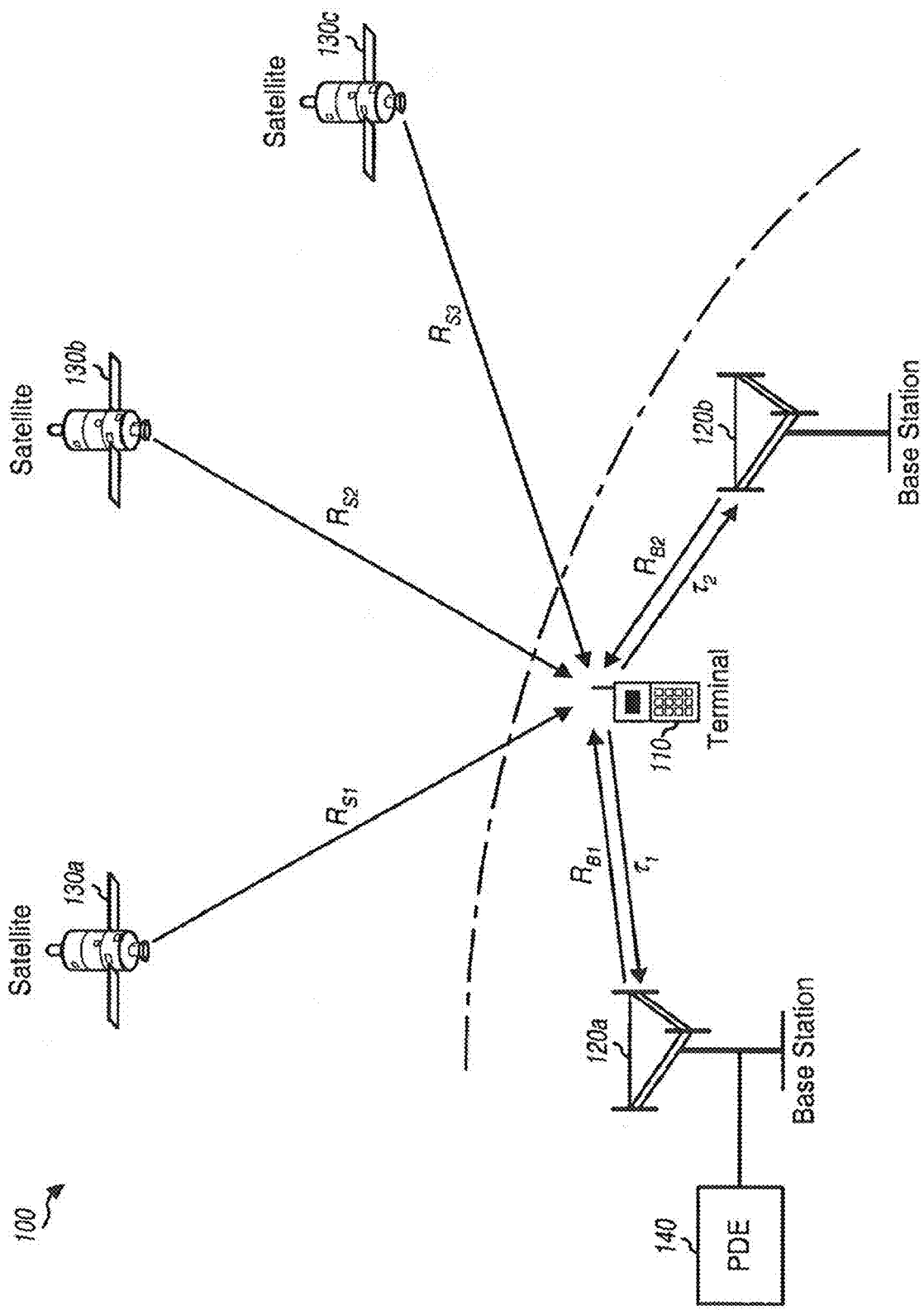
FIG. 1 is diagram of a hybrid position determination system that includes a number of position determination sub-systems.

FIG. 1 is diagram of a hybrid position determination system 100 that includes a number of position determination sub-systems. One such position determination sub-system is the well-known Global Positioning System (GPS). Another such position determination sub-system is a wireless (e.g., cellular) communication system, which may be a Code Division Multiple Access (CDMA) communication system or some other system. In general, hybrid position determination system 100 may include any number of position determination sub-systems that may be of any type (e.g., a Bluetooth, WI-FI or any other system capable of providing location related information). In a specific embodiment that is described in detail below, hybrid position determination system 100 includes the GPS and cellular communication system.

In hybrid position determination system 100, the position of a wireless terminal 110 may be determined based on signals from either a single position determination sub-system or multiple position determination sub-systems. For example, if system 100 includes the GPS and cellular communication system, then the position of terminal 110 may be determined based on (1) GPS alone, (2) the cellular communication system alone using a technique known as Advanced Forward Link Trilateration (A-FLT), or (3) both GPS and cellular communication system. Each position determination sub-system may be able to provide position estimates with certain accuracy and may be available for certain operating environments. If system 100 includes the GPS and cellular communication system, then the accuracy and availability for these systems may be briefly summarized (in descending order of accuracy) as shown in Table 1.

TABLE 1

| Measurement Type | Description |
| --- | --- |
| GPS | Solution based solely on GPS. Highest accuracy. May not be available for certain environments (e.g., indoors). |
| GPS and A-FLT | Hybrid solution based on a combination of GPS and cellular communication system. Intermediate accuracy. Improved indoors availability. |
| A-FLT | Solution based solely on the cellular communication system. Reduced accuracy. Commonly available in urban area and may be available where GPS is not available (e.g., indoors). |
| Enhanced CELL-ID | Solution based solely on the cellular communication system. Low accuracy (generally depends on the cell sector size and accuracy of round trip delay or similar measurement; may include other cellular measurements such as signal strength). |
| CELL-ID | Solution based solely on the cellular communication system. Lowest accuracy (provides only the identity of the cell where the terminal is located; therefore, accuracy is dependent on the size of the cell). |

Although the "GPS-based" solution has the highest accuracy in Table 1, an insufficient number of GPS satellites may be available in certain operating environments (e.g., indoors) to compute this solution. Assisted GPS may be implemented to improve sensitivity and reduce the amount of time needed to acquire the satellites. For assisted GPS, certain aiding information may be provided to the terminal and used to acquire and process the GPS signals. The aiding information may include, for example, timing information, information related to approximate GPS satellite locations, and so on.

For a "hybrid" solution based on measurements for both GPS and cellular communication system, one or more measurements for one or more base stations may be used in place of measurements for GPS satellites. The hybrid solution provides the highest attainable accuracy for cases where an insufficient number of GPS satellites are available to compute the GPS-based solution. For a "terrestrial-based" or "free-wheeling" solution (e.g., using A-FLT), no measurements for GPS satellites are used and the terminal position is determined based solely on measurements for base stations in the cellular communication system. For the hybrid and terrestrial-based solutions, the "actual" measurements based on signals received from the base stations are prone to exhibit relatively large errors due to (1) timing and hardware errors in the terminal and base stations and (2) errors due to the propagation environment. Consequently, the accuracy of a terrestrial-based solution is typically worse than that of a hybrid solution, which is typically worse than that of a GPS-based solution.

Techniques are provided herein to provide improved accuracy and service availability in determining a position estimate for a wireless terminal. In an aspect, the terminal's position is first accurately determined based on an accurate position determination sub-system (e.g., GPS) and used to determine residuals, which are corrections to be used for the actual measurements for a less accurate position determination sub-system (e.g., the cellular communication system). Thereafter, the terminal's position may be determined based on the best set of measurements then available for the terminal. For example, a GPS-based solution may be computed if measurements for a sufficient number of GPS satellites are available, a hybrid solution may be computed if measurement for at least one satellite is available, and a terrestrial-based solution may be computed if measurements for only base stations are available.

For the hybrid and terrestrial-based solutions, the actual measurement for each base station may be corrected with the residual determined earlier for that base station. The residuals may be used to mitigate errors that are introduced by various components of the wireless network and the propagation medium. In this way, the highest possible accuracy may be achieved for the terminal position estimate based on the available position determination sub-system(s). Moreover, high availability is provided for the position determination with the ability to supplement the more accurate (GPS) measurements with the less accurate (cellular) measurements when and to the extent needed.

For simplicity, various aspects and embodiments will be specifically described for measurements relating to pseudo-ranges. The pseudo-range to a base station may be measured based on pilot phase measurement, as is known in the art. Other means for measuring pseudo-ranges are known and may also be used. However, the techniques described herein may also be used for other types of measurement besides pseudo-range. For example, timing- and/or signal strength-related measurements may be obtained and used to determine the terminal position estimate. Other means for determining position without using pseudo-ranges are known. The techniques described herein may thus be used for various types of residuals and measurements.

In FIG. 1, terminal 110 receives signals transmitted from a number of transmitters, which may be base stations 120 of the cellular communication system and/or satellites 130 of the Global Positioning System. In general, any type of transmitter having locations that are known or can be ascertained may be used to determine the terminal's position. For example, terminal 110 may receive signal from an access point in a Bluetooth system. As used herein, a base station may be any earth-bound transmitter that transmits a signal that may be used for position determination.

Terminal 110 may be any device capable of receiving and processing signals from the position determination sub-systems to obtain timing, ranging, and/or location information. In one embodiment, terminal 110 is a cellular telephone capable of receiving signals from a number of transmitters. In other embodiments, terminal 110 may be an electronics unit (e.g., a computer terminal, a personal digital assistant (PDA), and so on) having a wireless modem, a receiver unit capable of receiving signals from satellites and/or base stations, or any other type of receiver The position of terminal 110 may be determined based on (1) distances to a sufficient number of transmitters, which are used as reference points, and/or (2) the locations of these transmitters. (Location of a Bluetooth transmitter or cellular repeater may be sufficient.) The terminal can estimate the distance to each transmitter by measuring the time required for a signal to travel from the transmitter to the terminal. If the time the signal is transmitted from the transmitter is known (e.g., stamped or encoded in the signal), then the travel time of the signal can be determined by observing the time the signal is received at the terminal (based on the terminal's internal clock). Typically however, the amount of time between transmission and reception cannot be exactly determined because of offsets between the clocks at the transmitter and terminal. Thus, a "pseudo-range" is typically derived based on the difference between a reference time and the time that the signal is received. The pseudo-range thus represents the relative distance between the terminal and the transmitter from which the signal was received.

The locations of the GPS satellites may be ascertained by processing the signals transmitted by the satellites. Each satellite transmits "Almanac" information, which includes information regarding coarse locations of all satellites in the constellation. Each satellite further transmits "Ephemeris" information, which includes a higher accuracy version of its own orbit, as tracked and reported by tracking stations on earth. The locations of the base stations may be made known (e.g., via messages) to the entity performing the position determination. For example, the terminal may include a database of the locations of the base stations and/or satellites, or these locations may be provided by a Location Server such as a Position Determining Entity (PDE) 140 or a base station as needed. Alternatively, the base station or PDE may perform the position determination for the terminal and may have the information for the satellite and/or base station locations. The location related information for the satellites and/or base stations may also be transmitted via messages.

The pseudo-range measurements to a sufficient number of transmitters (base stations and/or satellites) and the locations of these transmitters are typically provided to an algorithm that then computes a position estimate for the terminal based on this information using trilateration. One such algorithm is the well-known least mean square (LMS) algorithm. Other suitable algorithms may also be used, as are known in the art.

The computation to determine the terminal position estimate may be performed by the terminal, the PDE (Location Server), a base station, or some other entity. The entity performing the position determination is provided with the necessary information (e.g., the pertinent measurements and either the locations of the transmitters or the means to determine these locations).

As noted above, the position of terminal 110 may be determined based on signals from GPS alone, the cellular communication system alone, or both systems. For a GPS-based solution, pseudo-range measurements to four or more GPS satellites 130 are determined and used to solve for four unknowns, which are x,y,z in position and time bias or offset of the terminal. The result of the computation is an accurate 3-dimensional (3-D) position estimate (x,y,z) for the terminal.

For a hybrid solution based on signals from both GPS and cellular communication system, one or more measurements from one or more base stations may be used in place of measurements from GPS satellites. For example, referring to FIG. 1, a signal from base station 120a in the cellular communication system may be used to correct for the time bias of the terminal. For a CDMA system, each base station transmits a pilot signal on its forward link signal to the terminals within its coverage area. For many CDMA systems, the timing of the pilot signals from all base stations is synchronized with GPS system time. At terminal 110, the earliest arriving signal instance (or multipath component) from base station 120a to be used for demodulation is identified, the time of occurrence of this multipath component at the terminal's antenna connector is determined, and this time of occurrence may be used as the terminal's reference time. The terminal may then transmit a reverse link signal back to this same base station 120a such that the reverse link signal is delayed by a total of $2\tau$, which is referred to as the round trip delay (RTD). The RTD may be measured at base station 120a and used to adjust the terminal's time reference so that it corresponds to "true" GPS time. By synchronizing the terminal's clock with GPS time, the time bias at the terminal may be removed. A hybrid solution may then be obtained with only three pseudo-range measurements $R_{S1}$, $R_{S2}$, and $R_{S3}$ for three GPS satellites 130a, 130b, and 130c, respectively, which are all that is needed to solve for three unknowns (i.e., x, y, z in position) to compute the 3-D position estimate for the terminal. If altitude assistance is also available, then pseudo-range measurements to two satellites would be sufficient to solve for a position estimate.

The signals from the base stations may also be used for ranging, which would further reduce the number of satellites needed to determine the terminal's position. In particular, the pseudo-range $R_{Bi}$ from the terminal to base station i may be computed as:

$$R_{Bi} = c \cdot \tau_1, \qquad \text{Eq (1)}$$

where c is the speed of light and $\tau_i$ is the propagation delay from the terminal to base station i (i.e., $\tau_i$=RTD/2).

The pseudo-range measurements for the base stations may be combined with the pseudo-range measurements for the GPS satellites and used to compute a position estimate for the terminal. A hybrid solution may be obtained with (1) two pseudo-range measurements (e.g., $R_{S1}$ and $R_{S2}$) for two GPS satellites and one pseudo-range measurement (e.g., $R_{B1}$) for one base station, (2) one pseudo-range measurement (e.g., $R_{S1}$) for one GPS satellite and two pseudo-range measurements (e.g., $R_{B1}$ and $R_{B2}$) for two base stations, and so on. A terrestrial-based solution may also be obtained with two or more pseudo-range measurements (e.g., $R_{B1}$ and $R_{B2}$) for two or more base stations. In general, a sufficient number of measurements obtained from a combination of base stations and/or GPS satellites may be used to determine the position estimate for the terminal.

As noted above, pseudo-range measurements based on signals from the base stations are prone to exhibit relatively large errors due to various sources of error. One such error source is multipath effect in the propagation environment, which results in a signal transmitted from a base station reaching the terminal via an indirect path instead of a line-of-sight path. The indirect path may be created by reflection off one or more reflection sources, which are typically artifacts in the environment in which the terminal is operating (e.g., buildings, trees, or some other structures). Since the indirect path is longer than the line-of-sight path, the pseudo-range measurement based on a reflected signal is correspondingly longer. In an embodiment, a pseudo-range residual is determined for each base station that the terminal is in communication with. In another embodiment, a pseudo-range residual is determined for each base station that may be used to determine the position estimate for the terminal. In general, the pseudo-range residuals may be determined for any combination of one or more base stations. The pseudo-range residual is used to account for various sources of error including multipath effect.

Figure 2:
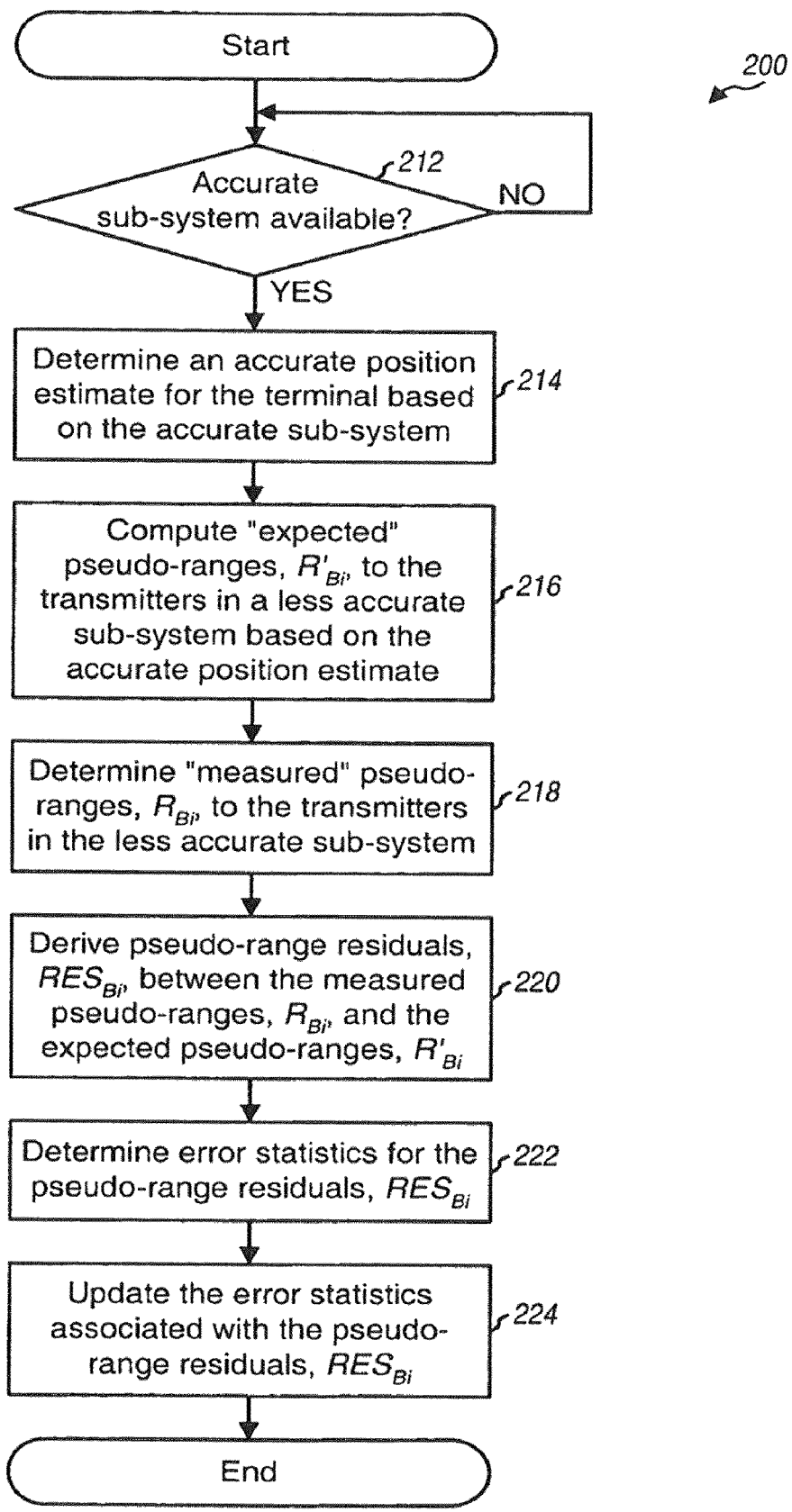
FIG. 2 is a flow diagram of a process for determining pseudo-range residuals for base stations in a cellular communication system.

FIG. 2 is a flow diagram of a process 200 for determining pseudo-range residuals for transmitters in a less accurate position determination sub-system (e.g., base stations in the cellular communication system). Initially, a determination is made whether or not an accurate position determination sub-system is available (step 212). This accurate position determination sub-system may be any system that may be used to accurately determine the position of the terminal, such as GPS. If the accurate position determination sub-system is not available, then the process waits until this sub-system is available. Otherwise, the process proceeds to step 214.

In step 214, an accurate position estimate for the terminal is determined based on the accurate position determination sub-system. For GPS, the signals from four or more GPS satellites may be measured and used to derive pseudo-ranges to these satellites. The pseudo-ranges may then be provided to an LMS or some other suitable algorithm to compute the accurate position estimate for the terminal, which is denoted as $(x,y,z)_T$. The accurate position estimate may also be obtained by other means, for example, by receiving a signal from an access point in a Bluetooth system or a pseudolite (described below), by manual input from the user, by receiving aiding information from a network entity (e.g., the PDE), and so on.

An "expected" pseudo-range, $R_{Bi}'$, from the terminal to each base station that may be used to determine the position estimate for the terminal at a later time is then computed based on (1) the accurate position estimate $(x,y,z)_T$ for the terminal, and (2) the location $(x,y,z)_{Bi}$ of the base station (step 216). This expected pseudo-range may be considered as the "true" range. The base station location may be provided to the terminal in the manner described above (e.g., via messages or signaling). The expected pseudo-range, $R_{Bi}'$, to base station i may be computed as:

$$R_{Bi}' = \|(x,y,z)_T - (x,y,z)_{Bi}\|, \text{ or} \qquad \text{Eq (2a)}$$

$$R_{Bi}' = \sqrt{(x_T - x_{Bi})^2 + (y_T - y_{Bi})^2 + (z_T - z_{Bi})^2}, \qquad \text{Eq (2b)}$$

where $(x,y,z)_T = x_T, y_T, z_T$ and $(x,y,z)_{Bi} = x_{Bi}, y_{Bi}, z_{Bi}$. The expected pseudo-range, $R_{Bi}'$, is representative of the line-of-sight distance between the terminal and base station i, and is an accurate value since it is computed based on the accurate position estimate $(x,y,z)_T$ for the terminal and the known location $(x,y,z)_{Bi}$ of the base station.

A "measured" pseudo-range, $R_{Bi}$, to each base station is then determined (step 218). This may be achieved by receiving and processing the signal from the base station, determining the time $\tau_i$ required for the signal to travel from the base station to the terminal, and computing the measured pseudo-range as $R_{Bi}=c\cdot\tau_i$. The time $\tau_i$ may be estimated based on the phase of the pilot in the forward link signal received from the base station (i.e., a pilot phase measurement) using the terminal's time reference, as is known in the art. The terminal's time reference may be calibrated or ascertained based on the GPS-based solution or the round trip delay as described above.

A pseudo-range residual, $RES_{Bi}$, for each base station that may be used to determine the position estimate for the terminal at a later time is next determined based on (1) the expected pseudo-range, $R_{Bi}'$, to the base station, and (2) the measured pseudo-range, $R_{Bi}$, to the base station (step 220). The pseudo-range residual, $RES_{Bi}$, for base station i may be computed as:

$$RES_{Bi} = R_{Bi}' - R_{Bi}. \qquad \text{Eq (3)}$$

The pseudo-range residual is indicative of the error between the (1) measured pseudo-range, $R_{Bi}$, which is derived based on the signal received from the base station, and (2) the expected pseudo-range, $R_{Bi}'$, which is computed based on some other more accurate information. The measured pseudo-range, $R_{Bi}$, may be expressed as:

$$R_{Bi} = R_{Bi}'' + T_i + B_i + M_i, \qquad \text{Eq (4)}$$

where $R_{Bi}''$ is the true range from the terminal to the base station, $T_i$ is representative of all errors associated with the terminal, $B_i$ is representative of all errors associated with the base station, $M_i$ is the error associated with the signal propagation environment which includes multipath. The true range, $R_{Bi}''$, may be approximated by the expected pseudo-range, $R_{Bi}'$ (i.e., $R_{Bi}'' \cong R_{Bi}'$). The errors associated with the terminal and base station typically do not change over time or may change gradually. The error $T_i$ includes a parameter $\eta$ that is representative of the error associated with receiver measurement noise (or thermal noise, which can be represented by Gaussian noise). The parameter $\eta$ changes from one measurement to next, but can be either (1) assumed to be negligible or (2) accounted for in similar manner as the errors in the pilot phase measurements. The multipath error, $M_i$, may be decomposed into (1) a large error component due to large obstructions (e.g., buildings, structures, and so on) that do not change over time (e.g., can be represented by an error process with a long time constant) and (2) a small error component due to other obstructions (e.g., can be represented by an error process with a short time constant). The small fast multipath error component may be considered negligible in comparison to the large slow multipath error component. Thus, the pseudo-range residual (which may be expressed as $RES_{Bi} \cong T_i + B_i + M_i$) is typically valid for at least a period of time, with the time duration being dependent on the characteristics of the propagation environment and other factors.

In an embodiment, the a posteriori errors associated with the terminal position estimates can be used to determine a priori measurement errors associated with the terrestrial pseudo-ranges. Various error parameters may be associated with the terminal position estimate and/or the pseudo-range residuals. For example, an error ellipse and its orientation may be determined for the position estimate. The position of each base station relative to the error ellipse may then be determined, and an error estimate may be derived for the pseudo-range residual depending on the location of the base station relative to the error ellipse. For example, a projection of a line-of-sight vector between a terminal position estimate and base station onto the error ellipse can be used as a measure of an error in the expected pseudo-range. The expected pseudo-range error estimate may also include the uncertainty in the base station location. The error estimate provides an indication of the confidence in (i.e., the quality of) the associated measure. For example, an error estimate of the pseudo-range residual may be used for future position estimates that rely on the pseudo-range residual. An example of such use may include the relative weighting of the residual by the LMS or some other suitable algorithm. Other parameters may also be evaluated (e.g., signal-to-noise-ratio (SNR), signal-to-interference ratio (SIR), signal strength of the pilot, RMS error, multipath error estimate, and so on) and used to derive the error estimate for the measured pseudo-range, and this is within the scope of the invention. The error estimate for the pseudo-range residual may include the error estimate for at least one of the estimated pseudo-range and the measured pseudo-range.

The error statistics for the position estimate and the pseudo-range residuals for the base stations are determined (step 222). The error statistics may include the error ellipse, the pilot SNR, and so on, and are used to derive error estimates. The error statistics associated with the pseudo-range residuals are then updated with the just determined error statistics (step 224). In this way, accurate and up-to-date error statistics may be maintained for the pseudo-range residuals. The process then terminates.

The relationship between a posteriori errors and a priori errors has been described above. The a posteriori errors associated with position estimate can be used to determine the associated error in the estimated pseudo-range, which in turn is used to compute the pseudo-range residual. The error estimates in pseudo-range residuals are a priori measurement errors.

In another embodiment, the pseudo-range residual for a particular base station may be determined from a collection of terrestrial pseudo-ranges obtained by a number of terminals in close proximity in both spatial and temporal domains. The pseudo-ranges between the terminal and the base stations may be reported to the cellular communication system (e.g., to the serving base station), which may then correlate the pseudo-range residuals with the terminal position estimate. The particular pseudo-range residual to be used for each base station by a given terminal may then be determined based on the collection of terrestrial pseudo-ranges provided by a number of terminals.

In yet another embodiment, the pseudo-range residual for a particular base station may be processed in a differential fashion, whereby the measured pseudo-range for a particular terminal is corrected with pseudo-range residual derived from the measurements by a number of terminals in close proximity in both spatial and temporal domains to this terminal. In an example, the pseudo-range residual for a base station may be provided to a mobile terminal by the cellular network as an element of an assistance data. Alternatively, this assistance data may be shared by mobile terminals in spatial proximity to each other.

Techniques to collect statistics for the pseudo-range measurements are also described in U.S. patent application Ser. No. 09/697,781 entitled "Method and Apparatus for Determining an Error Estimate in a Hybrid Position Determination System," filed Oct. 26, 2000, assigned to the assignee of the present application.

The pseudo-range residual described above may be advantageously used to improve the accuracy of the terminal position estimate. It has been found that there is a predictable relationship between certain parameters (such as the position of the terminal) and the amount of error in a less accurate set of measurements (e.g., the measured pseudo-ranges to the base stations). Therefore, by knowing both the value of the parameter and the amount of error associated with that parameter, an estimate of the amount of error in the less accurate measurements can be made. For example, by knowing the approximate position estimate of the terminal and the relationship between the position estimate and the amount of error associated with the position estimate, the amount of error in the measured pseudo-ranges to the base stations in the cellular communication system can be estimated.

A hybrid position determination system includes two (or possibly more) position determination sub-systems. As shown in Table 1, different position determination sub-systems may be associated with different accuracy capability and may be available under different environments. In an aspect, a position estimate for the terminal is determined based on the most accurate position determination sub-system or combination of sub-systems available to the terminal at the time the position estimate is determined. Moreover, to provide improved accuracy, the measurements for the less accurate position determination sub-system may be corrected (or compensated) using the pseudo-range residuals determined for that sub-system.

Figure 3:
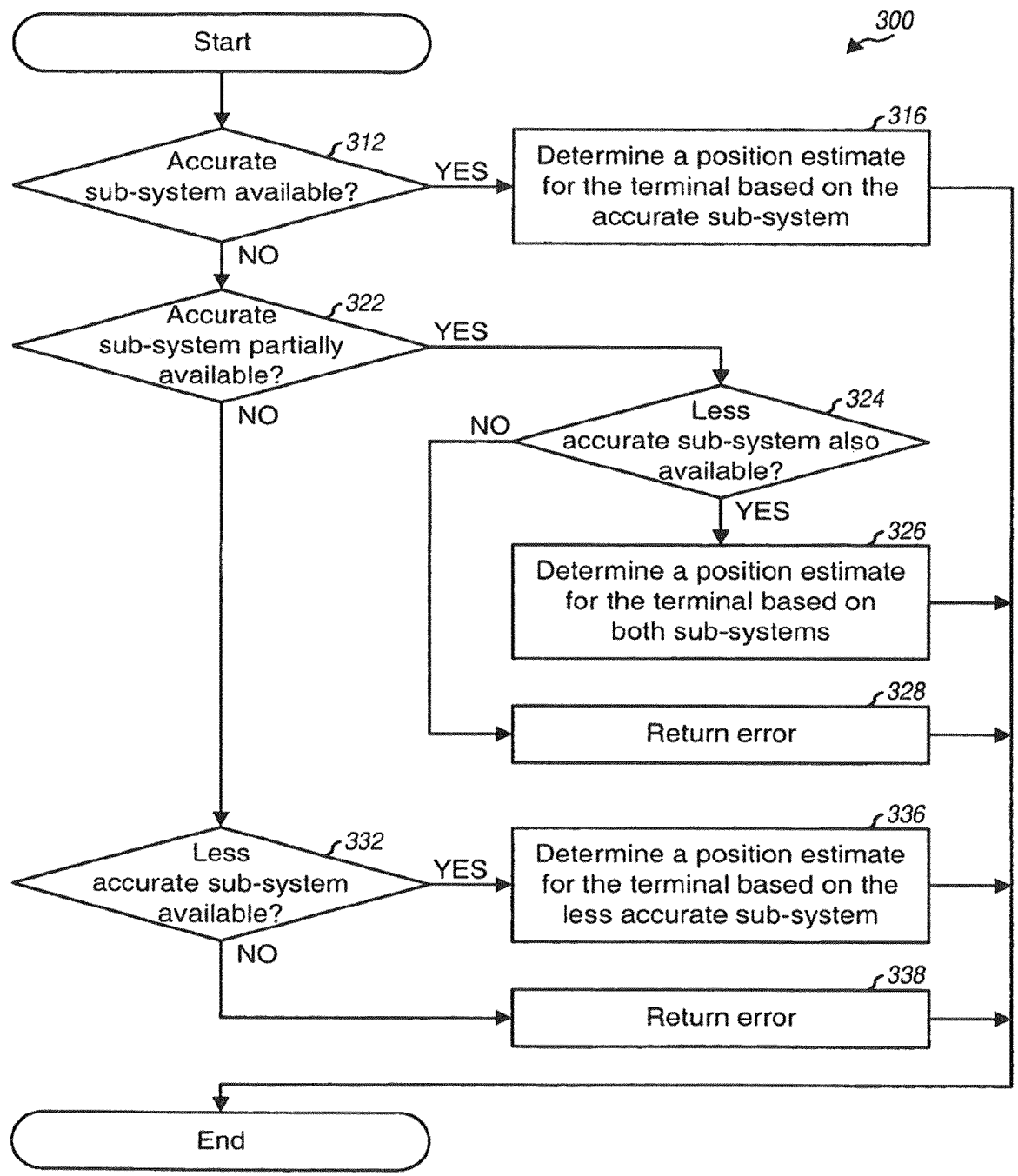
FIG. 3 is a flow diagram of a process for determining a position estimate for a wireless terminal in a manner such that high accuracy and high service availability are achieved.

FIG. 3 is a flow diagram of a process 300 for determining a position estimate for a wireless terminal in a manner such that high accuracy and availability are achieved. Each position determination sub-system in the hybrid position determination system is associated with an independently derived set of measurements. The terminal may be designed with the capability to determine its position (1) based solely on measurements for transmitters in the accurate position determination sub-system, (2) based on measurements for transmitters in both accurate and less accurate position determination sub-systems, or (3) based solely on measurements for transmitters in the less accurate position determination sub-system. To achieve high accuracy and availability, the best set of measurements available for the terminal is used to determine the position estimate.

Initially, a determination is made whether or not the accurate position determination sub-system is available (step 312). This accurate position determination sub-system may be any system that may be used to accurately determine the position estimate for the terminal, such as GPS. The measurements for the satellites typically have greater accuracy than the measurements for the base stations due to various factors, including the fact that the satellites are overhead and there is greater probability that the signals from the satellites will reach the terminal via a direct path. Thus, if the accurate position determination sub-system is available, then a position estimate for the terminal is determined based solely on the accurate position determination sub-system (step 316). For GPS, signals from a sufficient number of (e.g., four or more) GPS satellites may be measured and used to derive pseudo-ranges to these satellites, which are further used to compute an accurate position estimate $(x,y,z)_T$ for the terminal. The process for computing the terminal position fix then terminates. In certain implementations, the pseudo-range residuals may be updated based on the accurate position estimate determined in step 316. In this case, steps 216 through 224 in FIG. 2 may be performed after step 316.

Otherwise, if the accurate position determination sub-system is not available to derive a solution based solely on this sub-system, then a determination is made whether or not the accurate position determination sub-system is at least partially available (step 322). Generally, for GPS, four or more GPS satellites are needed to derive a 3-D position estimate for the terminal. The minimum number of satellites required for a terminal position fix may be reduced if other aiding information is available such as, for example, timing of CDMA networks, altitude assistance, and so on. If fewer than the minimum number of satellites is available, then the measurements for the available satellites may be used in combination with the measurements for the base stations to derive a hybrid solution that would have the next highest accuracy. A determination is thus made whether or not the less accurate position determination sub-system is also available to derive the hybrid solution (step 324). This less accurate position determination sub-system may be any system that may also be used to assist and/or determine the position of the terminal, such as the cellular communication system. In an embodiment, the measurements for the base stations are only used to supplement the measurements for the satellites when an insufficient number of satellites are available and only to the extent necessary.

If the accurate and less accurate position determination sub-systems are available, then a position estimate for the terminal is determined based on the combination of these sub-systems (step 326). A hybrid solution may be obtained by (1) obtaining actual measurements (e.g., measured pseudo-ranges) for a sufficient number of transmitters (e.g., satellites and base stations), (2) correcting the actual measurements obtained for the less accurate position determination sub-system with the residuals determined earlier for this less accurate sub-system, and (3) determining the terminal position estimate based on a combination of actual measurements for the accurate position determination sub-system and corrected measurements for the less accurate position determination sub-system. Alternatively, the residuals do not have to be determined earlier; they may be provided as assistance to the terminal in near real-time. Moreover, uncorrected measurements for the less accurate position determination sub-system may also be used to determine the hybrid solution, if residuals are not available for the transmitters associated with these uncorrected measurements. Step 326 is described in further detail below. In certain implementations, the pseudo-range residuals may be updated based on the position estimate determined in step 326. In this case, steps 216 through 224 in FIG. 2 may be performed after step 326. The process then terminates. Back in step 324, if the combination of the accurate and less accurate position determination sub-systems is insufficient to obtain a hybrid solution, then an error message may be returned (step 328), and the process would thereafter terminate.

If the accurate position determination sub-system is not available at all, as determined in step 322, then a determination is made whether or not the less accurate position determination sub-system is available (step 332). For the cellular communication system, two or more base stations may be sufficient to derive a position estimate for the terminal. If the less accurate position determination sub-system is available, then the position estimate for the terminal is determined based on measurements obtained for this sub-system (step 336). To provide improved accuracy for the solution, the actual measurements are corrected with the residuals determined earlier for this less accurate sub-system (if the residuals are available). Step 336 is also described in further detail below. The process then terminates. Back in step 332, if the less accurate position determination sub-system is not available, then an error message may be returned (step 338), and the process would thereafter terminate. Alternatively, prior to termination in step 338, the system may fall back to a "safety net" solution such as Enhanced CELL-ID, compute a position estimate, and then terminate the process. In such an implementation, the above system will always generate a position estimate with varying accuracy depending on the availability of various position determination sub-systems.

In the above description, for steps 326 and 336, one or more measurements obtained for one or more transmitters in the second sub-system may be selected for use to determine the position estimate for the terminal. The transmitter measurements may be selected based on one or more selection criteria. Such criteria may include, for example, the availability of accurate base station almanac information, the presence of repeaters, statistical measures (such as RMS, signal-to-noise ratio (SNR), signal-to-interference ratio (SIR), multipath, an overall weighting factor that may depend on the availability of the residual), and so on.

In an embodiment, an initial and accurate position estimate is determined for the terminal using information for the accurate position determination sub-system (or possibly for both the accurate and less accurate position determination sub-systems). The position estimate for the terminal may thereafter be updated based on measurements for the accurate and/or less accurate position determination sub-systems.

In an embodiment, if any satellite measurements are available, then these measurements are used in the computation of the updated position estimate. Upon loss of signals from the accurate position determination sub-system, a free-wheeling solution may be obtained by using only measurements for the less accurate position determination sub-system to update the position estimate. The free-wheeling solution may be provided if the accurate position determination sub-system is not available (e.g., no GPS satellites are visible) or if it's desirable to stay tune to the less accurate position determination sub-system. The free-wheeling solution may be derived and used until it is decided that this solution is no longer reliable or needed.

To improve the quality of the updates to the terminal position estimate under the free-wheeling scenario and to compensate for the errors in the terrestrial measurements, the pseudo-range residuals are applied to newly measured terrestrial pseudo-ranges. It can be shown that forward or reverse link information from two base stations is sufficient to update a 2-D position estimate of the terminal. Because of the inherent time-variant nature of the channel impairments, the update will degrade with time and eventually a new GPS-based solution can be obtained for an accurate position estimate.

Figure 4:
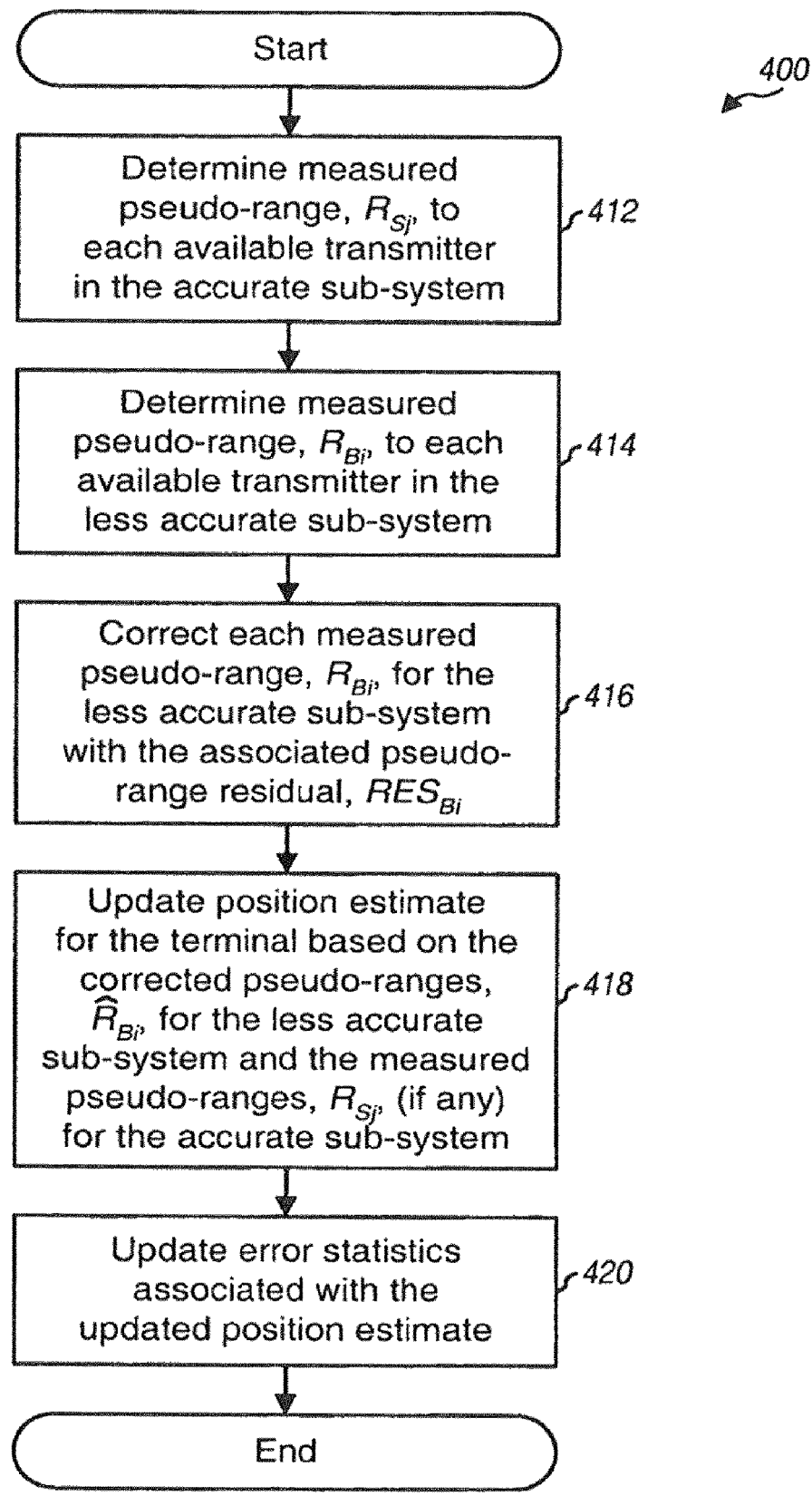
FIG. 4 is a flow diagram of a process for determining a position estimate for a terminal using pseudo-range residuals to provide improved accuracy.

FIG. 4 is a flow diagram of a process 400 for determining a position estimate for a wireless terminal using pseudo-range residuals to provide improved accuracy. Process 400 may be used for each of steps 326 and 336 in FIG. 3. In certain situations, a sufficient number of measurements for the accurate position determination sub-system are not available to compute an accurate (e.g., GPS-based) solution. In such situations, it may be necessary to compute the terminal position estimate using one or more measurements for a less accurate position determination sub-system. The measurements obtained for transmitters in the less accurate position determination sub-system may be corrected to account for the errors in these measurements.

Initially, measurements for the accurate position determination sub-system, if this sub-system is available, are determined (step 412). For example, the measured pseudo-range, $R_{Sj}$, to each available GPS satellite may be determined based on the signal received from the satellite. Next, measurements for the less accurate position determination sub-system are determined (step 414). For example, the measured pseudo-range, $R_{Bi}$, to each available base station may be determined based on the signal received from the base station. A sufficient number of measurements are obtained from steps 412 and 414 to determine a terminal position estimate. For example, a hybrid solution may be obtained for a 3-D position estimate based on (1) measurements for three GPS satellites and one base station, (2) measurements for two GPS satellites and one base station (for both time and range), or (3) measurements for one GPS satellite and two base stations. A free-wheeling solution may be obtained for the terminal position estimate based on measurements for two or more base stations.

In an embodiment, each measurement for the less accurate position determination sub-system is then corrected, if the associated residual is available (step 416). For example, the measured pseudo-range, $R_{Bi}$, to each base station to be used to determine the terminal position estimate may be corrected with the pseudo-range residual, $RES_{Bi}$, determined for the base station. The corrected pseudo-range, $\hat{R}_{Bi}$, for base station i may be computed as:

$$\hat{R}_{Bi} = R_{Bi} - RES_{Bi}. \qquad \text{Eq (5)}$$

Alternatively, if residual corrections are not available for all measurements for the less accurate position determination sub-system, then a selection process may be performed to determine which measurements for the less accurate sub-system may be used in the position estimate determination process. Selection may be based on the availability of the residual corrections, base station geometry relative to the terminal (may be expressed in terms of Horizontal Dilution of Precision (HDOP), quality of the measured pseudo-ranges, or some other statistical parameters.

The corrected measurements for the less accurate position determination sub-system are then used with the actual measurements (if any) for the accurate position determination sub-system to determine a position estimate for the terminal or to update the terminal position estimate (step 418). For example, a hybrid solution may be computed based on (1) measured pseudo-ranges to one or more GPS satellites, (2) the location of these satellites, (3) corrected pseudo-ranges to one or more base stations, and (4) the location of these base stations. A terrestrial-based solution may be computed based on (1) corrected pseudo-ranges to two or more base stations, and (2) the location of these base stations. An algorithm to compute a hybrid or terrestrial-based solution based on the above information is described below. Error statistics associated with the updated position estimate may also be updated (step 420).

The LMS algorithm may perform a number of iterations to determine a position estimate for the terminal. For each iteration, expected measurements for a sufficient number of transmitters are computed based on the current position estimate for the terminal, an error vector between the expected and actual measurements is computed, and the current position estimate is updated based on the computed error. The algorithm may terminate when the computed error is sufficiently small (e.g., below a particular threshold).

For the LMS algorithm, the position estimate for the terminal in the k-th iteration may be denoted as $P_k = [x_k \ y_k \ z_k]^T$, and the locations of the transmitters are denoted as $L_i = [x_i \ y_i \ z_i]^T$, for $i = \{1, 2, \ldots N\}$, where the superscript "T" denotes the transpose. In an embodiment, the position estimate for the terminal may also include a temporal component, $t_k$, to account for any clock errors. In such case, the position estimate for the terminal in the k-th iteration may be denoted as $P_k = [x_k \ y_k \ z_k \ t_k]^T$. A column vector of N computed measurements $\tilde{R}_k = [\tilde{R}_{1,k} \ \tilde{R}_{2,k} \ \ldots \ \tilde{R}_{N,k}]^T$ can be determined for the k-th iteration based on (1) the current position estimate of $P_k = [x_k$ $y_k z_k]^T$ for the terminal and (2) the locations of the N transmitters. This vector $\tilde{R}_k$ includes one computed measurement $\tilde{R}_{i,k}$ for each of the N transmitters to be used to determine the terminal position estimate. The measurement may be of any one of a number of possible types. In one embodiment, the measurement relates to pseudo-range. The pseudo-range between the current terminal position estimate, $P_k$, and the location $L_i$ of the i-th transmitter may be computed as:

$$\tilde{R}_{i,k} = \sqrt{(x_k-x_i)^2+(y_k-y_i)^2+(z_k-z_i)^2}. \quad \text{Eq (6)}$$

A geometry matrix $H_k$ for the transmitter locations (i.e., $L_i=[x_i \ y_i \ z_i]^T$ for $i=\{1, 2, \ldots N\}$) and the current terminal position estimate, $P_k=[x_k \ y_k \ z_k]^T$, may be defined as:

$$H_k = \begin{bmatrix} \frac{x_k-x_1}{\tilde{R}_{1,k}} & \frac{y_k-y_1}{\tilde{R}_{1,k}} & \frac{z_k-z_1}{\tilde{R}_{1,k}} \\ \frac{x_k-x_2}{\tilde{R}_{2,k}} & \frac{y_k-y_2}{\tilde{R}_{2,k}} & \frac{z_k-z_2}{\tilde{R}_{2,k}} \\ \vdots & \vdots & \vdots \\ \frac{x_k-x_N}{\tilde{R}_{N,k}} & \frac{y_k-y_N}{\tilde{R}_{N,k}} & \frac{z_k-z_N}{\tilde{R}_{N,k}} \end{bmatrix}. \quad \text{Eq (7)}$$

A covariance matrix C of the measurements may be defined as:

$$C=E\{R \cdot R^T\}-E\{R\} \cdot E\{R^T\}, \quad \text{Eq (8)}$$

where R is a vector of pseudo-ranges for the N transmitters (i.e., the measured pseudo-ranges, $R_{S_j}$, for the satellites (if any) and the corrected pseudo-ranges, $\hat{R}_{B_i}$, for the base stations, all of which are derived based on signal measurements), and E is the statistical expectation. For a hybrid solution, the vector R may include two measured pseudo-ranges to two GPS satellites and one corrected pseudo-range to one base station (e.g., $R=[R_{S1} \ R_{S1} \ \hat{R}_{B1}]^T$), one measured pseudo-range to one GPS satellite and two corrected pseudo-ranges to two base stations (e.g., $R=[R_{S1} \ \hat{R}_{B1} \ \hat{R}_{B2}]^T$), and so on. For a free-wheeling solution, the vector R may include two or more corrected pseudo-ranges to two or more base stations (e.g., $R=[\hat{R}_{B1} \ \hat{R}_{B2} \ \hat{R}_{B3}]^T$).

An error vector, $e_k$, may be computed as:

$$e_k=R-\tilde{R}_k. \quad \text{Eq (9)}$$

As shown in equation (9), the error vector, $e_k$, is equal to the difference between the pseudo-range vector, R, and the computed pseudo-range vector, $\tilde{R}_k$, which is derived based on the current terminal position estimate, $P_k$, at the k-th iteration.

An update vector, $\Delta_k$, is then computed based on the error vector, $e_k$, as follows:

$$\Delta_k=(H^T C^{-1} H)^{-1} H^T C^{-1} \cdot e_k. \quad \text{Eq (10)}$$

This update vector, $\Delta_k$, represents an estimated error from the current position estimate, $P_k$, to the optimal position estimate. Thus, an updated position estimate for the terminal may be expressed as:

$$P_{k+1}=P_k+\Delta_k. \quad \text{Eq (11)}$$

Equations (6) through (11) comprise the computations for one iteration of the LMS algorithm. A number of iterations may be performed to derive a more and more accurate position estimate for the terminal.

The computation to determine the terminal position estimate is also described in U.S. Pat. No. 6,166,685, entitled "Wireless User Position Update Using Infrastructure Measurements," issued Dec. 26, 2000, and U.S. Pat. No. 5,999,124, entitled "Satellite Positioning System Augmentation with Wireless Communication Signals," issued Dec. 7, 1999.

Figure 5:
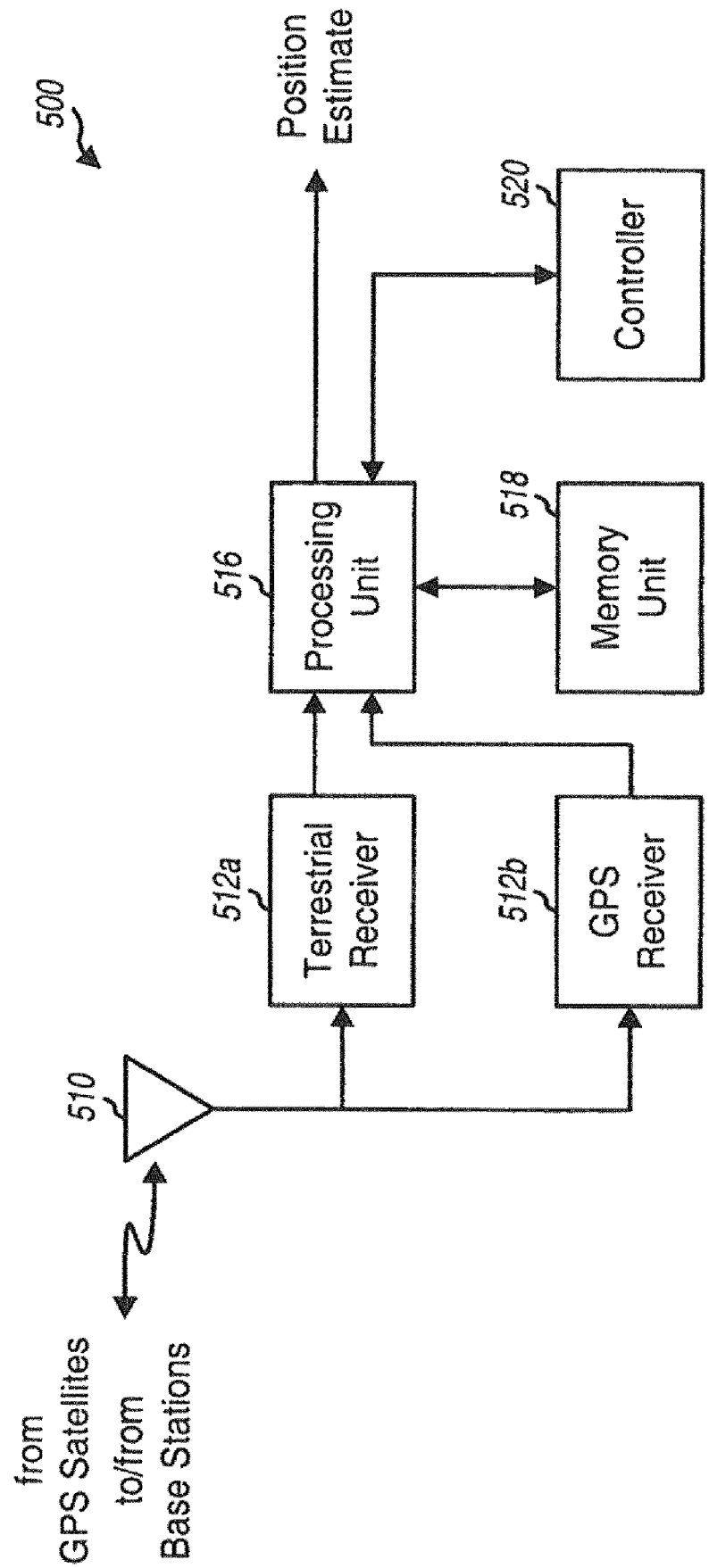
FIG. 5 is a block diagram of an embodiment of a receiver unit, which may be a component of a wireless terminal.

FIG. 5 is a block diagram of an embodiment of a receiver unit 500, which may be a component of a wireless terminal. Receiver unit 500 may be designed with the capability to process signals from multiple position determination sub-systems such as GPS and cellular communication system. In the embodiment shown in FIG. 5, receiver device 500 includes an antenna 510, a terrestrial receiver 512a, a GPS receiver 512b, a processing unit 516, a memory unit 518, and a controller 520.

Antenna 510 receives signals from a number of transmitters (which may be any combination of GPS satellites and/or base stations) and provides the received signal to terrestrial and GPS receivers 512a and 512b. Terrestrial receiver 512a includes front-end circuitry (e.g., radio frequency (RF) circuitry and/or other processing circuitry) that processes the signals transmitted from base stations to obtain information used for position determination. For example, terrestrial receiver 512a may measure the phase of the pilot in the forward link signal received from each base station to derive timing information, which may thereafter be used to derive a measured pseudo-range to the base station.

Terrestrial receiver 512a may implement a rake receiver that is capable of concurrently processing multiple signal instances (or multipath components) in the received signal. The rake receiver includes a number of finger processors (or fingers), each of which may be assigned to process and track a particular multipath component. Even though multiple finger processors may be assigned to process multiple multipath components for a given base station, only one corrected pseudo-range for one multipath component (e.g., the earliest arriving multipath component, or the strongest multipath component) is typically used for position determination. A pseudo-range residual may be derived for each finger processor and used to correct the measured pseudo-range for that finger processor. Alternatively, a timing (or ranging) relationship between different fingers may be established and maintained. In this way, it is possible to use different multipath components of a given base station for position determination depending on the fading and multipath effects.

GPS receiver unit 512b includes front-end circuitry that processes signals transmitted from GPS satellites to derive information used for position determination. The processing by receivers 512a and 512b to extract the pertinent information from the GPS and terrestrial signals are known in the art and not described in detail herein. Receivers 512a and 512b provide to processing unit 516 various types of information such as, for example, timing information, the identities and locations of the transmitters whose signals are received, and so on.

Processing unit 516 may (e.g., periodically) derive an accurate estimate of the position of receiver unit 500 based on the accurate position determination sub-system (e.g., GPS). Processing unit 516 may determine a pseudo-range residual for each base station that may later be used for position determination based on (1) the accurate position estimate, (2) the measured pseudo-range to the base station, and (3) the location of the base station, as described above. Processing unit 516 may thereafter determine the position estimate for the receiver unit based on measured pseudo-ranges to GPS satellites and/or corrected pseudo-ranges to base stations. If measured pseudo-ranges to base stations are to be used for position determination, then processing unit 516 may correct each such measured pseudo-range based on the associated pseudo-range residual to obtain the corresponding corrected pseudo-range. (The pseudo-range residual for any given base station may be zero if no information is known for the base station.) Processing unit 516 may execute an algorithm to compute the terminal position estimate based on the measurements for the GPS satellites and/or base stations.

Memory unit 518 stores various data used for determining position. For example, memory unit 518 may store the GPS satellite location related information (which may be derived from the Almanac and/or Ephemeris), the locations of the base stations (which may be provided via signaling), and the pseudo-range residuals. Memory unit 518 may also store program codes and data for processing unit 516.

Controller 520 may direct the operation of processing unit 516. For example, controller 520 may select the particular types of solution to be computed (e.g., GPS, hybrid, terrestrial, or safety-net), the particular algorithm to be used (if more than one is available), and so on.

Although not shown in FIG. 5, receiver unit 500 may communicate with a Location Server (or PDE), which may assist in determining the terminal position estimate. The PDE may perform the computations to derive the position estimate, or may provide certain information used to (1) acquire satellite and/or terrestrial measurements and/or (2) determine the position estimate (e.g., the acquisition assistance, timing assistance, information related to the location of the GPS satellites and/or base stations, and so on).

The techniques described herein may also be used with other position determination systems besides the hybrid position determination system, if some other means are available to determine the position of the terminal at some times or locations, but not at others. In this case, an accurate position estimate of the terminal (however obtained) may be used as a reference to determine the residuals (which may be indicative of errors in the measured pseudo-ranges) for the less accurate position determination sub-system.

The techniques described herein for utilizing the available GPS and terrestrial signals in a manner to provide high accuracy and high availability in determining a terminal position estimate may be used in conjunction with various wireless communication systems and networks. For example, these techniques may be used for CDMA, time division multiple access (TDMA), frequency division multiple access (FDMA), and other wireless communication systems. These systems may implement one or more applicable standards. For example, the CDMA systems may implement IS-95, cdma2000, IS-856, W-CDMA, and so on. The TDMA systems may implement GSM and so on. These various standards are known in the art.

In this discussion, reference has been made to the United States Global Positioning System (GPS), which is an example of a Satellite Positioning System (SPS). It should be evident, however, that these methods are equally applicable to other satellite positioning systems, such as the Russian Glonass system and European Galileo system. Thus, the term "GPS" used herein includes such alternative satellite positioning systems, including the Russian Glonass and European Galileo systems. Likewise, the term "GPS signals" includes signals from alternative satellite positioning systems.

Furthermore, although reference is made to GPS satellites, it will be appreciated that the teachings are equally applicable to positioning systems which utilize pseudolites or a combination of satellites and pseudolites. Pseudolites are ground-based transmitters which broadcast a PN code (similar to a GPS signal) modulated on an L-band (or other frequency) carrier signal, generally synchronized with GPS time. Each such transmitter may be assigned a unique PN code so as to permit identification by a remote receiver. Pseudolites are useful in situations where GPS signals from an orbiting satellite might be unavailable, such as tunnels, mines, buildings, urban canyons or other enclosed areas. The term "satellite", as used herein, is intended to include pseudolites or equivalents of pseudolites, and the term "GPS signals", as used herein, is intended to include GPS-like signals from pseudolites or equivalents of pseudolites.

The position determination techniques described herein may be implemented by various means. For example, these techniques may be implemented in hardware, software, or a combination thereof. For a hardware implementation, the elements used to implement any one or a combination of the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the position determination techniques may be implemented with modules (e.g., procedures, functions, and so on) that perform the functions described herein. The software codes may be stored in a memory unit (e.g., memory 518 in FIG. 5) and executed by a processor (e.g., processing unit 516 or controller 520). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method comprising:
at a mobile device, receiving signals from a first more accurate position determination sub-system;
generating information indicative of a position of the mobile device based on the signals received from the first more accurate position determination sub-system;
at a first time, receiving signals at the mobile device from at least a first transmitter included in a second less accurate position determination sub-system, wherein the first transmitter is located at an associated position;
at a different time, receiving signals at the mobile device from the first transmitter in response to selecting a position solution type using the second less accurate position determination sub-system;
accessing pseudorange residual information for the first transmitter, wherein the pseudorange residual information for the first transmitter is derived from the information indicative of the position of the mobile device based on the signals received from the first more accurate position determination sub-system, the associated position of the first transmitter, and the signals received at the mobile device from the first transmitter at the first time; and
using the signals received at the mobile device from the first transmitter at the different time and the pseudorange residual information for the first transmitter to determine information indicative of the position of the mobile device at the different time.

2. The method of claim 1, wherein the information indicative of the position of the mobile device based on the signals received from the first more accurate position determination sub-system comprises pseudoranges to a plurality of satellites.

3. The method of claim 1, further comprising, at the first time, receiving signals from one or more additional transmitters included in the second less accurate position determination sub-system, wherein each of the one or more additional transmitters included in the second less accurate position determination sub-system is located at an associated position, and wherein the one or more additional transmitters included in the second less accurate position determination sub-system comprises a second transmitter.

4. The method of claim 3, further comprising, at the different time:
receiving signals at the mobile device from the second transmitter;
accessing pseudorange residual information for the second transmitter, wherein the pseudorange residual information for the second transmitter is derived from the information indicative of the position of the mobile device based on the signals received from the first more accurate position determination sub-system, the associated position of the second transmitter, and the signals received at the mobile device from the second transmitter at the first time; and
wherein using the signals received at the mobile device from the first transmitter at the different time and the pseudorange residual information for the first transmitter to determine information indicative of the position of the mobile device at the different time comprises using the signals received at the mobile device from the first transmitter at the different time, the pseudorange residual information for the first transmitter, the signals received at the mobile device from the second transmitter at the different time, and the pseudorange residual information for the second transmitter to determine information indicative of the position of the mobile device at the different time.

5. The method of claim 1, wherein the first more accurate position determination sub-system comprises a satellite positioning sub-system, the second less accurate position determination sub-system comprises a terrestrial positioning sub-system, and wherein selecting a position solution type using the second less accurate position determination sub-system comprises selecting a terrestrial position solution utilizing only terrestrial transmitters or selecting a hybrid position solution utilizing terrestrial transmitters and satellite transmitters.

6. A mobile device comprising:
a satellite signal receiver including satellite processing circuitry to process received satellite signals to derive satellite information for position determination;
a terrestrial signal receiver including terrestrial processing circuitry to process received terrestrial signals to derive terrestrial information for position determination;
a controller to select a position solution type;
wherein the mobile device is configured to:
use the satellite processing circuitry to generate information indicative of a position of the mobile device based on satellite signals received at the satellite signal receiver;
at a first time, receive signals at terrestrial signal receiver from at least a first terrestrial transmitter, wherein the first transmitter is located at an associated position;
at a different time, receive signals at the mobile device from the first transmitter in response to controller selection of a position solution type using at least terrestrial positioning techniques;
access pseudorange residual information for the first transmitter, wherein the pseudorange residual information for the first transmitter is derived from the information indicative of the position of the mobile device based on satellite signals received at the satellite signal receiver, the associated position of the first transmitter, and the signals received at the mobile device from the first transmitter at the first time; and
using the signals received at the mobile device from the first transmitter at the different time and the pseudorange residual information for the first transmitter to determine information indicative of the position of the mobile device at the different time.

7. The mobile device of claim 6, wherein the terrestrial processing circuitry comprises a rake receiver including a plurality of finger processors.

8. The mobile device of claim 7, wherein the mobile device is configured to assign different ones of the plurality of finger processors to process different multipath components of the signals received at the mobile device from the first transmitter at the different time.

9. The mobile device of claim 6, wherein the mobile device is configured to communicate with a location server.

10. The mobile device of claim 6, wherein the first transmitter is a base station selected from the group consisting of a cellular base station and an access point.

11. A mobile device comprising:
means for receiving signals from a first more accurate position determination sub-system at a mobile device;
means for generating information indicative of a position of the mobile device based on the signals received from the first more accurate position determination sub-system;
means for receiving signals at the mobile device from at least a first transmitter included in a second less accurate position determination sub-system at a first time, wherein the first transmitter is located at an associated position;
means for receiving signals at the mobile device from the first transmitter at a different time, in response to selecting a position solution type using the second less accurate position determination sub-system;
means for accessing pseudorange residual information for the first transmitter, wherein the pseudorange residual information for the first transmitter is derived from the information indicative of the position of the mobile device based on the signals received from the first more accurate position determination sub-system, the associated position of the first transmitter, and the signals received at the mobile device from the first transmitter at the first time; and
means for using the signals received at the mobile device from the first transmitter at the different time and the pseudorange residual information for the first transmitter to determine information indicative of the position of the mobile device at the different time.

12. The device of claim 11, wherein the information indicative of the position of the mobile device based on the signals received from the first more accurate position determination sub-system comprises pseudoranges to a plurality of satellites.

13. The device of claim 11, wherein the means for receiving signals at the mobile device from at least a first transmitter included in a second less accurate position determination sub-system at a first time comprises terrestrial processing circuitry to process signals from terrestrial transmitters.

14. The device of claim 13, wherein the terrestrial processing circuitry comprises a rake receiver including a plurality of finger processors.

15. The device of claim 14, further comprising means for assigning different ones of the plurality of finger processors to process different multipath components of the signals received at the mobile device from the first transmitter at the different time.

16. The device of claim 11, further comprising means for communicating with a location server.

\* \* \* \* \*